(12) United States Patent
Tran et al.

(10) Patent No.: US 7,837,891 B2
(45) Date of Patent: Nov. 23, 2010

(54) FATTY ACID BY-PRODUCTS AND METHODS OF USING SAME

(75) Inventors: Bo L. Tran, Chicago, IL (US); Dmitri L. Kouznetsov, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/957,009

(22) Filed: Dec. 14, 2007

(65) Prior Publication Data

US 2008/0093267 A1 Apr. 24, 2008

Related U.S. Application Data

(63) Continuation-in-part of application No. 11/355,468, filed on Feb. 16, 2006.

(51) Int. Cl.
*B03D 1/02* (2006.01)
*B03D 1/008* (2006.01)

(52) U.S. Cl. .......................... 252/61; 209/166

(58) Field of Classification Search ................ 252/61; 209/166

See application file for complete search history.

(56) References Cited

U.S. PATENT DOCUMENTS

| | | | |
|---|---|---|---|
| 2,163,702 A | | 6/1939 | Ried |
| 2,312,466 A | * | 3/1943 | Erickson et al. ............. 209/166 |
| 2,377,129 A | | 5/1945 | Christmann et al. |
| 2,383,580 A | * | 8/1945 | Arrowsmith et al. ......... 554/167 |
| 2,383,633 A | * | 8/1945 | Trent .......................... 554/167 |
| 4,148,720 A | | 4/1979 | Wang et al. |
| 4,233,150 A | | 11/1980 | Wang et al. |
| 4,340,467 A | | 7/1982 | Wang et al. |
| 4,589,980 A | | 5/1986 | Keys |
| 4,678,562 A | | 7/1987 | Keys |
| 4,915,825 A | | 4/1990 | Christie |
| 6,375,853 B1 | * | 4/2002 | Yoon ........................... 210/727 |
| 6,799,682 B1 | | 10/2004 | Yoon |
| 6,871,743 B2 | | 3/2005 | Yoon |
| 2003/0146134 A1 | | 8/2003 | Yoon |
| 2004/0244278 A1 | * | 12/2004 | Siggelkow et al. ............ 44/389 |
| 2005/0269248 A1 | * | 12/2005 | Cameron et al. ............ 209/166 |

FOREIGN PATENT DOCUMENTS

| | | |
|---|---|---|
| BR | 9302739 | 1/1995 |
| WO | 2004/098782 | 11/2004 |
| WO | WO 2004098782 A1 * | 11/2004 |

OTHER PUBLICATIONS

"Biodiesel Production Technology" Van Gerpen et al., Iowa State University, National Renewable Energy Laboratory (NREL)-NREL/SR-510-36244 Published Jul. 2004.*
Kirk-Othmer, A Wiley-Interscience Publication; Encyclopedia of Chemical Technology, Fourth Edition.

* cited by examiner

*Primary Examiner*—Thomas M Lithgow
(74) *Attorney, Agent, or Firm*—Benjamin E. Carlsen; Michael B. Martin

(57) ABSTRACT

Methods and compositions for separating materials are provided. In an embodiment, the present invention provides a method of separating a first material from a second material. For example, the method can comprise mixing the first material and the second material in a slurry with a beneficiation composition. The beneficiation composition can comprise one or more fatty acid by-products derived from a biodiesel manufacturing process or derived from transesterification reactions involving triglycerides. Air bubbles can be provided in the slurry to form bubble-particle aggregates with the first material and the bubble-particle aggregates can be separated from the second material.

13 Claims, No Drawings

FATTY ACID BY-PRODUCTS AND METHODS OF USING SAME

CROSS REFERENCE TO RELATED APPLICATIONS

This is a continuation-in-part of application Ser. No. 11/355,468, filed Feb. 16, 2006.

BACKGROUND

The present invention relates generally to beneficiation technologies. More specifically, the present invention relates to beneficiation compositions and methods of using same.

Beneficiation is a method of separating useful matter from waste. Commonly, beneficiation uses the difference in the hydrophobicity of the respective components. During this process, the mineral ore is comminuted to a certain small size and slurried with water. The slurry is introduced into a flotation apparatus purged with air. The air preferentially attaches to the hydrophobic particles of the slurry, making them float to the top of the apparatus. The floated particles are collected, dewatered, and accumulated as a sellable final product. The hydrophilic particles tend to migrate to the bottom of the contact vessel from where they can be removed as tailings and processed into waste impoundments. In other processes, such as reverse flotation, the sellable final product may migrate to the bottom.

To facilitate beneficiation, several types of conventional reagents are used such as frothers, collectors, promoters and conditioners. Nevertheless, these reagents can be expensive and toxic thereby reducing the cost-effectiveness of the beneficiation processes.

It is therefore desirable to provide and utilize cost-effective and effective beneficiation compositions.

SUMMARY

The present invention relates generally to beneficiation technologies. More specifically, the present invention relates to beneficiation compositions and methods of using same.

In an embodiment, the present invention provides a method of separating a first material from a second material. For example, the method can comprise mixing the first material and the second material in a slurry with a beneficiation composition. The beneficiation composition can comprise one or more fatty acid by-products derived from a biodiesel manufacturing process. The beneficiation composition can also comprise one or more fatty acid by-products of transesterification reactions involving triglycerides. Air bubbles can be provided in the slurry to form bubble-particle aggregates with the first material and the bubble-particle aggregates can be allowed to be separated from the second material.

In an embodiment, the fatty acid by-product can be generated at several stages during the manufacture of biodiesel, including the crude glycerin processing phase. It can be derived, but not exclusively, from the addition of acid to the fatty acid salts solution of a crude fatty acid alkyl esters phase during the biodiesel manufacturing process and/or derived from the addition of acid to the fatty acid salts solution of a crude glycerin phase during the biodiesel manufacturing process. For example, the fatty acid by-product can be derived from the biodiesel manufacturing process by adding acid to the bottom effluent of the esterification stage and/or by adding acid to the wash water (e.g. soap water) of the ester product. The fatty acid by-product can also be derived from the acidulation of any of the biodiesel manufacturing process streams containing one or more fatty acid salts component.

In an embodiment, the fatty acid by-product comprises about one to about 50 weight percent of one or more alkyl esters and about 50 to about 99 weight percent of one or more fatty acids.

In an embodiment, the fatty acid by-product further comprises one or more components selected from the group consisting of methyl esters, salts, methanol, glycerin, triglycerides, diglycerides, monoglycerides, water and combinations thereof.

In an embodiment, the free fatty acids comprise one or more components selected from the group consisting of palmitic acid, palmitoleic acid, stearic acid, oleic acid, linoleic acid, linolenic acid, arachidic acid, eicosenoic acid, behenic acid, lignoceric acid, tetracosenic acid and combinations thereof.

In an embodiment, the fatty acid by-product comprises one or more components selected from the group consisting of $C_6$-$C_{24}$ saturated and unsaturated fatty acids, $C_6$-$C_{24}$ saturated and unsaturated fatty acids salts, methyl esters, ethyl esters and combinations thereof.

In an embodiment, the fatty acid by-product comprises about 50 weight percent to about 90 weight percent alkyl esters.

In an embodiment, the fatty acid by-product further comprises one or more components selected from the group consisting of $C_1$-$C_6$ mono-, di- and trihydric alcohols and combinations thereof.

In an embodiment, the fatty acid by-product further comprises one or more inorganic salts.

In an embodiment, the beneficiation composition further comprises fuel oil.

In an embodiment, the fuel oil is selected from the group consisting of kerosene, diesel fuel and combinations thereof.

In another embodiment, the present invention provides a method of separating hydrophobic and hydrophilic particles in an aqueous slurry. For example, the method can comprise adding a beneficiation composition to the aqueous slurry to increase the hydrophobicity of the hydrophobic particles. The beneficiation composition can comprise one or more fatty acid by-products derived from a biodiesel manufacturing process. The aqueous slurry can be mixed to assist the fatty acid by-product in adsorbing on the surface of the hydrophobic particles so as to increase the hydrophobicity of the hydrophobic particles. Air bubbles can be provided to the aqueous slurry so that the hydrophobic particles collect on the surface of the air bubbles forming bubble-particle aggregates. The bubble-particle aggregates can be allowed to float to the surface of the aqueous slurry to be separated from the hydrophilic particles.

In an alternative embodiment, the present invention provides a beneficiation composition comprising one or more fatty acid by-products derived from a biodiesel manufacturing process or transesterification reaction involving triglycerides. The beneficiation composition can further comprise fuel oil as an additive.

In another embodiment, the present invention provides a beneficiation composition comprising fuel oil and one or more fatty acid by-products of transesterification reactions involving triglycerides.

An advantage of the present invention is to provide cost-effective methods of separating two or more materials.

Another advantage of the present invention is to provide hydrophobicity enhancing compositions that can be used in flotation processes that have improved cost-savings.

Additional features and advantages are described herein, and will be apparent from, the following Detailed Description.

DETAILED DESCRIPTION

The present invention relates generally to beneficiation technologies. More specifically, the present invention relates to beneficiation compositions and methods of using same.

In the present specification, the term "beneficiation" means separating useful matter from waste, particularly hydrophobic substances from hydrophilic substances. Suitable processes for accomplishing this include, but are not limited to, flotation, reverse flotation and similar technologies.

"By-products" means by-products derived from biodiesel manufacturing processes, and/or transesterification reactions involving triglycerides.

"Alkyl esters" means alkyl esters of fatty acids as defined herein. Representative alkyl esters include methyl and ethyl esters. "Methyl esters" means methyl esters of fatty acids as defined herein.

In an embodiment, the present invention provides beneficiation compositions comprising by-products of biodiesel manufacturing. The by-products of biodiesel manufacturing can comprise, for example, mixtures of straight-chain, monocarboxylic acids containing from 6 to 24 carbon atoms.

The by-products of biodiesel manufacturing of the present invention were surprisingly found to be effective as reagents for use in beneficiation technologies such as, for example, flotation processes. In addition, these by-products are generally environmentally benign and non-hazardous. The by-products are also non-flammable and can provide benefits in applications where there is a "high" flash point requirement. The by-products can be used to supplement or replace conventional hazardous collectors for flotation processes such as diesel fuel thereby reducing the dependency on such environmentally unfriendly materials. Diesel fuel is used ubiquitously in the mineral processing industry. A good portion of the spent diesel from the processes is injected underground posing an environmental and human health hazard. The present invention offers an added benefit of not posing any environmental and/or human health hazard if discharged underground.

Biodiesel is a cleaner-burning diesel replacement fuel made from natural, renewable sources. For example, biodiesel can include fatty acid alkyl esters used as a cleaner-burning diesel replacement fuel made from sources such as new and used vegetable oils and animal fats.

According to the American Fuel Data Center of the U.S. Department of Energy, approximately 55% of the biodiesel is currently produced from recycled fat or oil feedstock, including recycled cooking grease. The other half of the industry is limited to vegetable oils, the least expensive of which is soy oil. The soy industry has been the driving force behind biodiesel commercialization because of excess production capacity, product surpluses, and declining prices. Similar issues apply to the recycled grease and animal fats industry, even though these feedstocks are less expensive than soy oils. Based on the combined resources of both industries, there is enough of the feedstock to supply 1.9 billion gallons of biodiesel.

Biodiesel can be made through a chemical process called transesterification in which vegetable oil or animal fats are converted to fatty acid alkyl esters, glycerin and remaining compounds from which the fatty acid by-products are derived. Such oils and fats include, for example, tallow, crude tall oil, coconut oil, rapeseed oil, canola oil, palm kernel oil and soybean oil. Triglycerides, the principal components of animal fats and of vegetable oils, are esters of glycerol, a trihydric alcohol, with fatty acids of varying molecular weight. Three synthetic pathways can be used to produce fatty acid alkyl esters from oils and fats:

base-catalyzed transesterification of the oil;

direct acid-catalyzed esterification of the oil; and conversion of the oil to fatty acids and subsequent esterification to biodiesel.

The majority of fatty acid alkyl esters are produced by the base-catalyzed method. In general, the catalyst used for transesterification of the oil to produce biodiesel commercially can be typically any base, most preferably sodium hydroxide or potassium hydroxide.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel, and the oils and fats are added. The system can then be closed, and held at about 71° C. (160° F.) for a period of about 1 to 8 hours, although some systems recommend that the reactions take place at room temperature.

Once the reactions are complete the oil molecules (e.g. triglycerides) are broken apart and two major products are produced: 1) a crude fatty acid alkyl esters phase (i.e. biodiesel phase) and 2) a crude glycerin phase. Typically, the crude fatty acid alkyl esters phase forms a layer on top of the denser crude glycerin phase. Because the glycerol phase is more dense than the biodiesel phase, the two can be gravity separated, for example, with the glycerol phase simply drawn off the bottom of a settling vessel. In some cases, a centrifuge may be employed to speed the separation of the two phases.

In an embodiment, the fatty acid by-products can originate from the refining of the crude fatty acid alkyl esters phase and/or the crude glycerin phase during the biodiesel manufacturing process. For example, the crude fatty acid alkyl esters phase typically includes a mixture of fatty acid alkyl esters, water and a fatty acid salts component. These fatty acid salts component generally form a solution with the water phase (e.g. soap water) where they can be further separated from the fatty acid alkyl esters component. Once separated from the fatty acid alkyl esters component, any suitable acid such as, for example, hydrochloric acid can be added to the water phase containing the fatty acid salts component to produce the fatty acid by-products of the present invention.

In an embodiment, the fatty acid by-products can contain high levels of alkyl esters of the fatty acid by-products. The concentration of alkyl esters can range from about one weight percent to about 90 weight percent. Alkyl esters of fatty acids can improve the separation properties of the beneficiation compositions.

Similarly, the crude glycerin phase typically includes a mixture of glycerin, water and a fatty acid salts component. This fatty acid salts component forms a solution or suspension with the water phase where it can be further separated from the glycerin component by adding any suitable acid to recover the fatty acid by-products suitable for the present invention.

It should be appreciated that the fatty acid by-products of the present invention can be derived from the acidulation of any of the biodiesel manufacturing process streams/stages that contain the fatty acid salts component (e.g. soap water) including, for example, the wash water. These fatty acid by-products derived from any of the different stages/streams of the biodiesel manufacturing process can be used as a valuable component of the beneficiation compositions of the present invention. The fatty acid by-products of biodiesel manufacturing can be produced in ever increased amounts. As a result, the biodiesel manufacturing by-products are inexpensive and their use can be economical and highly effective for a variety of beneficiation technologies.

In an embodiment, the fatty acid by-products from biodiesel manufacturing can be comprised of fatty acids and methyl and ethyl esters. Additional components of the by-products can include salts, methanol, ethanol, glycerin, mono-, di-, and tri-glycerides, and moisture (e.g. water). In an embodiment, the fatty acid by-product further comprises about 0.01 to about 5 weight percent methanol.

The mixture of the fatty acids can comprise palmitic acid, palmitoleic acid, stearic acid, oleic acid, linoleic acid, linolenic acid, arachidic acid, eicosenoic acid, behenic acid, lignoceric acid, tetracosenic acid and combinations thereof. The remaining components can include moisture and unsaponifiable matter.

In an alternative embodiment, the fatty acid by-product compositions can include one or more $C_6$-$C_{24}$ saturated and unsaturated fatty acids, their salts and methyl and/or ethyl esters. The by-product can further include one or more $C_1$-$C_6$ mono-, di- or trihydric alcohols such as, for example, methanol, ethanol, glycerin and glycols. In an embodiment, the by-products can contain about 0.01 to about 15 weight percent of the $C_1$-$C_6$ mono-, di- and trihydric alcohols.

The by-products can further include one or more inorganic salts such as, for example, salts (e.g. chlorides and sulfates) of sodium, potassium and/or calcium. In an embodiment, the by-products can contain about 0.05 to about 15 weight percent of the inorganic salts.

In an embodiment, the fatty acid by-product comprises about 40 weight percent to about 90 weight percent alkyl esters.

In an embodiment, the fatty acid by-product comprises about 50 weight percent to about 60 weight percent fatty acid methyl esters, about 0.01 weight percent to about 1 weight percent methanol, and about 0.01 weight percent to about 1 weight percent glycerin.

The by-products described herein can be used to make hydrobicizing reagents suitable for use as a collector or promoter in flotation or similar processes. For example, the strongly hydrophobic $C_6$-$C_{24}$ fatty acids contained in the by-products are known to facilitate the attachment of air bubbles during flotation.

Furthermore, the fatty acid by-products can be rich in the unsaturated oleic, linoleic, and linolenic fatty acids. Once these fatty acids coat the processed particles (e.g. during flotation) they can slowly crosslink in the presence of air forming a tenacious hydrophobic layer.

In an alternative embodiment, the fatty acid by-products can further be mixed with additives to improve the separation properties of these beneficiation compositions. In an embodiment, such additives can include fuel oil such as, for example, kerosene, diesel fuel and combinations thereof. In an embodiment, the fatty acid by-products are admixed with about 0.01 weight percent to about 1 weight percent of one or more fuel oils.

Generally, fuel oil can comprise mixtures of aliphatic and aromatic hydrocarbons. In addition, fuel oil can contain small amounts of sulfur, oxygen, nitrogen compounds and other substances. By way of example and not limitation, typical components of kerosene (Fuel oil #1) and diesel fuel (Fuel oil #2) are listed in the following Table 1. It should be appreciated that kerosene and diesel fuel can comprise any suitable hydrocarbon component combinations.

TABLE 1

Typical Components of Fuel Oils

| Hydrocarbon type | Fuel oil #1 (volume %) | Fuel oil #2 (volume %) |
| --- | --- | --- |
| Alkylbenzenes | 13% | 6% |
| Biphenyls/acenaphthenes | 0.4% | 3% |
| Dinaphthenobenzenes/indenes | 1% | 2% |
| Fluorenes/acenaphthylenes | — | 1.4% |
| Indans/tetralins | 3% | 4% |
| Naphthalenes | 3% | 8% |
| Phenanthrenes | — | 0.7% |
| Paraffins (n- and iso-) | 53% | 41% |
| Monocycloparaffins | 21% | 22% |
| Bicycloparaffins | 5% | 10% |
| Tricycloparaffins | 1% | 2% |
| Total aromatic hydrocarbons | 20% | 25% |
| Total saturated hydrocarbons | 80% | 75% |

In an embodiment, the beneficiation composition of the invention comprises a blend of the fatty acid by-product, and one or more $C_4$-$C_{16}$ alcohols, aldehydes or esters. In an embodiment, the $C_4$-$C_{16}$ alcohols, aldehydes or esters are 1-propene hydroformylation reaction products. In an embodiment, the $C_4$-$C_{16}$ alcohol is 4-methyl cyclohexane methanol (MCHM).

The presence of the $C_4$-$C_{16}$ alcohols, aldehydes or esters facilitates the beneficiation composition distribution in the flotation slurry. In an embodiment, the beneficiation composition comprises about 70 to about 80 percent by weight of the fatty acid by-product, about 10 to about 20 percent by weight of one or more fuel oils, and about 1 to about 20 percent by weight of $C_4$-$C_{16}$ alcohols, aldehydes or esters.

In an embodiment, this invention provides methods of enhancing the hydrophobicity of compounds in certain beneficiation processes. For example, the beneficiation compositions comprising the fatty acid by-products can be useful in beneficiation of the following materials including, but not limited to, the group of coal, plastics, sand and gravel, phosphates, diamonds, and other mineral ores or man-made matter. In alternative embodiments, the beneficiation compositions can be used in processes to increase the hydrophobicity of particulate materials, particularly in applications such as flotation resulting in the beneficiation of coal, phosphates, diamond ore, and the like. The beneficiation compositions can also be used in conjunction with other suitable flotation collectors and promoters.

Flotation processes are one of the most widely used methods of separating the valuable material from valueless material present, for example, in particulates or fines. For example, in this process, the fine particles are dispersed in water or other suitable solution and small air bubbles are introduced to the slurry so that hydrophobic particles can be selectively collected on the surface of the air bubbles and exit the slurry (e.g. by rising to the surface) while hydrophilic particles are left behind. The hydrophilic particles can also sink to the bottom of the slurry to be collected as a sludge.

The fatty acid by-products can be used to separate materials, for example, in any suitable flotation process. It should be appreciated that the desired final products can rise to the surface during flotation and/or sink to the bottom, such as in reverse flotation processes. For example, during silica flotation processes, the desired product can sink to the bottom of the slurry and the waste product can rise to the top of the slurry.

In alternative embodiments, the fatty acid by-product can be derived from the addition of acid to the fatty acid salts solution of a crude fatty acid alkyl esters phase during the biodiesel manufacturing process and/or derived from the addition of acid to the fatty acid salts solution of a crude glycerin phase during the biodiesel manufacturing process.

The materials to be separated can have any suitable size. By example and not limitation, the materials can range from 2 mm to 0.04 mm in size. The slurry can also have up to 50% solids. Any suitable mechanical or chemical forces can be used to bring the slurry particles in contact with the beneficiation compositions of the present invention. The floated product and the non-floated tailings can be collected from the present methods.

EXAMPLES

By way of example and not limitation, the following examples are illustrative of various embodiments of the present invention.

Example 1

A sample of coal slurry from a Pennsylvania coal preparation plant was floated in the laboratory using a Denver flotation machine. The tests were designed to determine the utility of the fatty acid by-products as standalone collectors. The frother used in these tests was crude 4-methyl cyclohexane methanol. The fatty acid by-product was obtained by acidulation of the biodiesel reactor bottoms and biodiesel wash water. In examples 1 and 2, "tonne" means 1,000 kg (2,204.6 pounds).

The results indicate that the fatty acid by-product is less effective than Fuel Oil #2 under the same conditions. However, the material showed collector performance similar to that of neat fuel oil collector when the frother dosage was increased.

TABLE 2

Collector Performance of Fuel Oil #2 and Neat Fatty Acid By-Product Compared

| | MCHM frother, 0.15 kg/tonne | | | | MCHM frother, 0.30 kg/tonne | |
| --- | --- | --- | --- | --- | --- | --- |
| | Fuel Oil | | Fatty Acid By-Product | | Fatty Acid By-Product | |
| Collector Dose kg/tonne | Conc. Ash (%) | Combustible Recovery (%) | Conc. Ash (%) | Combustible Recovery (%) | Conc. Ash (%) | Combustible Recovery (%) |
| 0.37 | 9.5 | 54.8 | 13.2 | 27.1 | 10.8 | 57.7 |
| 0.75 | 8.9 | 77.9 | 12.2 | 48.0 | 10.6 | 66.7 |
| 1.50 | 8.6 | 75.2 | 10.4 | 62.2 | 11.3 | 77.7 |

Example 2

Further flotation tests were conducted using the same test conditions as in Example 1 on a different batch of coal slurry obtained from the same plant. The frother utilized was again crude 4-methyl cyclohexane methanol dosed at 0.15 kg/tonne. The same biodiesel by-product was used for preparing two collector blends. Blend 8:1:1 was prepared from 80% by weight of the biodiesel by-product, 10% by weight of fuel oil, and 10% by weight of the 1-propene hydroformylation product. Blend 7:2:1 was prepared from 70% by weight of the biodiesel by-product, 20% by weight of fuel oil, and 10% by weight of the 1-propene hydroformylation product. The results indicate that the collector blends containing from 10% to 20% fuel oil match or outperform the neat fuel oil collector at the same frother level.

TABLE 3

Collector Performance Of Fatty Acid By-Product Blends and Neat Fuel Oil Compared

| | Fuel Oil | | Blend 8:1:1 | | Blend 7:2:1 | |
| --- | --- | --- | --- | --- | --- | --- |
| Collector kg/tonne | Conc. Ash (%) | Combustible Recovery (%) | Conc. Ash (%) | Combustible Recovery (%) | Conc. Ash (%) | Combustible Recovery (%) |
| 0.75 | 12.2 | 60.5 | 12.9 | 67.4 | 11.9 | 68.9 |
| 1.50 | 11.5 | 70.5 | 12.4 | 77.5 | 12.6 | 76.1 |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beneficiation composition comprising at least one fatty acid by-product derived from a biodiesel manufacturing process or transesterification reactions involving triglycerides, wherein the fatty acid by-product includes at least one glyceride and unsaponifiable matter and the composition further comprises water and inorganic salt wherein the fatty acid byproduct includes at least one of a methyl ester or ethyl ester and wherein the fatty acid by-product comprises about 50 weight percent to about 60 weight percent fatty acid methyl esters, about 0.01 weight percent to about 1 weight percent methanol, and about 0.01 weight percent to about 1 weight percent glycerin.

2. The beneficiation composition of claim 1 which further comprises one or more fuel oils.

3. The beneficiation composition of claim 2 which comprises about 70 to about 80 weight percent of one or more fatty acid by-products, about 10 to about 20 weight percent of fuel oil and about 1 to about 20 weight percent of one or more $C_4$-$C_{16}$ alcohols, aldehydes or esters.

4. The beneficiation composition of claim 2 which comprises about 99.9 fatty acid by-product and about 0.1 weight percent of one or more fuel oils.

5. The beneficiation composition of claim 4, wherein the fuel oils are selected from the group consisting of kerosene, diesel fuel and combinations thereof.

6. The beneficiation composition of claim 1, wherein the fatty acid by-product comprises about 40 weight percent to about 90 weight percent alkyl esters.

7. The beneficiation composition of claim 1, wherein the fatty acid by-product further comprises fatty acid methyl esters, methanol, and glycerin.

8. The beneficiation composition of claim 1, wherein the fatty acid by-product further comprises one or more components selected from the group consisting of fatty acid methyl esters, ethyl esters, salts, methanol, ethanol, glycerin, monoglycerides, diglycerides, triglycerides, water and combinations thereof 9. The beneficiation composition of claim 1, wherein the fatty acid by-product comprises one or more components selected from the group consisting of $C_6$-$C_{24}$ saturated and unsaturated fatty acids, $C_6$-$C_{24}$ saturated and unsaturated fatty acids salts, methyl esters, ethyl esters and combinations thereof.

10. The beneficiation composition of claim 9, wherein the fatty acids are selected from the group consisting of palmitic acid, palmitoleic acid, stearic acid, oleic acid, linoleic acid, linolenic acid, arachidic acid, eicosenoic acid, behenic acid, lignoceric acid, tetracosenic acid and combinations thereof.

11. The beneficiation composition of claim 10, wherein the fatty acid by-product further comprises one or more components selected from the group consisting of $C_1$-$C_6$ mono-, di- and trihydric alcohols and combinations thereof.

12. The beneficiation composition of claim 10, wherein the beneficiation composition further comprises fuel oil, and one item selected from the list consisting of: $C_4$ - $C_{16}$ alcohols, $C_4$ - $C_{16}$ aldehydes, $C_4$ - $C_{16}$ esters, and any combination thereof.

13. A beneficiation composition comprising at least one fatty acid by-product derived from a biodiesel manufacturing process or transesterification reactions involving triglycerides wherein the fatty acid by-product comprises about 50 weight percent to about 60 weight percent fatty acid methyl esters, about 0.01 weight percent to about 1 weight percent methanol, and about 0.01 weight percent to about 1 weight percent glycerin.

\* \* \* \* \*